United States Patent

Yamamoto et al.

(10) Patent No.: US 9,812,742 B2
(45) Date of Patent: Nov. 7, 2017

(54) MANUFACTURING METHOD FOR NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Kunimitsu Yamamoto, Toyota (JP); Yukiyoshi Ueno, Toyota (JP); Tomoyuki Mizuno, Toyota (JP); Junko Ohira, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/627,286

(22) Filed: Feb. 20, 2015

(65) Prior Publication Data

US 2015/0244032 A1  Aug. 27, 2015

(30) Foreign Application Priority Data

Feb. 25, 2014  (JP) .................. 2014-034662

(51) Int. Cl.
*H01M 10/44* (2006.01)
*H01M 10/0525* (2010.01)
*H01M 10/058* (2010.01)

(52) U.S. Cl.
CPC ....... *H01M 10/446* (2013.01); *H01M 10/058* (2013.01); *H01M 10/0525* (2013.01); *H01M 2220/20* (2013.01); *Y02E 60/122* (2013.01); *Y02P 70/54* (2015.11); *Y10T 29/49108* (2015.01)

(58) Field of Classification Search
None
See application file for complete search history.

(56) References Cited

U.S. PATENT DOCUMENTS

| 2011/0181249 A1* | 7/2011 | Deguchi | H01M 10/0525 320/149 |
| 2011/0236732 A1* | 9/2011 | Meehan | H01M 2/0469 429/53 |
| 2012/0141869 A1 | 6/2012 | Takahata | |

FOREIGN PATENT DOCUMENTS

| JP | 07296853 A | * 11/1995 |
| JP | 2007-311107 A | 11/2007 |
| JP | 2012231609 A | * 11/2012 |
| KR | 1020110059699 A | 6/2011 |
| KR | 1020120061917 A | 6/2012 |

* cited by examiner

*Primary Examiner* — Daniel Gatewood
(74) *Attorney, Agent, or Firm* — Sughrue Mion, PLLC

(57) ABSTRACT

A manufacturing method according to the present invention is a method for manufacturing a nonaqueous electrolyte secondary battery including graphite as a negative-electrode active material. The manufacturing method includes: a step of assembling the battery including a positive electrode and a negative electrode; and a step of performing an initial charging process of performing first charging on the battery. In the initial charging process, charging is performed at a relatively large first current value when a gas generation amount caused in the battery during the charging does not depend on a charging current value, and the charging is performed at a second current value smaller than the first current value when the gas generation amount depends on the charging current value.

10 Claims, 6 Drawing Sheets

MANUFACTURING METHOD FOR NONAQUEOUS ELECTROLYTE SECONDARY BATTERY

INCORPORATION BY REFERENCE

The disclosure of Japanese Patent Application No. 2014-034662 filed on Feb. 25, 2014 including the specification, drawings and abstract is incorporated herein by reference in its entirety.

BACKGROUND OF THE INVENTION

1. Field of the Invention

The present invention relates to a manufacturing method for a nonaqueous electrolyte secondary battery.

2. Description of Related Art

In recent years, a lithium-ion secondary battery, a nickel metal hydride battery, and other nonaqueous electrolyte secondary batteries (e.g., Japanese Patent Application Publication No. 2007-311107 (JP 2007-311107 A)) have been used as an in-vehicle power supply and a power supply for a PC and a portable terminal. Particularly, the significance of the lithium-ion secondary battery that is lightweight and has a high energy density is increased as an in-vehicle high-output power supply. In the lithium-ion secondary battery, charging and discharging is performed such that lithium ions are delivered between a positive electrode made of a positive-electrode active material and a negative electrode made of a negative-electrode active material. That is, lithium (a charge carrier) is pulled from the positive-electrode active material at the time of charging and released into an electrolyte as a lithium ion. At the time of charging, the lithium ion is intercalated into a structure of the negative-electrode active material (for example, layered graphite) provided on a negative electrode side. The lithium ion obtains an electron coming through an external circuit from the positive-electrode active material, and is stored herein.

SUMMARY OF THE INVENTION

In the meantime, a battery just assembled is in a non-charge state, so a first charging process is performed on the battery. That is, a charging process to be performed for the first time after battery constituents such as a positive electrode, a negative electrode, and an electrolyte are assembled is performed on the battery. Hereinafter, the first charging process is referred to as the "initial charging." When the initial charging is performed, gas is generated in the battery to increase an internal pressure, in general. From the viewpoint of production efficiency, the charging should be finished as soon as possible. However, if the internal pressure is increased excessively, a relief valve of the battery is activated, so the battery may be unusable. Accordingly, it is requested to shorten the time for the initial charging while preventing the increase in the internal pressure of the battery.

A manufacturing method for a nonaqueous electrolyte secondary battery suggested herein is a method for manufacturing a nonaqueous electrolyte secondary battery including graphite as a negative-electrode active material, and a positive-electrode active material including a charge carrier (e.g., lithium in a case of a lithium-ion secondary battery) that can be held between layers of the graphite at the time of charging. The manufacturing method includes a step of assembling a battery including a positive electrode and a negative electrode. Further, the manufacturing method includes a step of performing an initial charging process of performing first charging on the battery. Here, in the initial charging process, charging is performed at a relatively large first current value when a gas generation amount caused in the battery during the charging does not depend on a charging current value, and the charging is performed at a second current value smaller than the first current value when the gas generation amount depends on the charging current value.

According to such a configuration, when the gas generation amount caused in the battery during the initial charging does not depend on the charging current value, the charging is performed at the relatively large first current value. Accordingly, it is possible to shorten a charging time as compared with a conventional technique. Further, when the gas generation amount caused in the battery during the initial charging depends on the charging current value, the charging is performed at the second current value smaller than the first current value. Accordingly, it is possible to restrain generation of gas in the battery, as compared with the case where the charging is performed at the first current value. Consequently, according to the present invention, it is possible to prevent an increase in an internal pressure of the battery, and to finish the charging in a short time.

In one preferable aspect of the manufacturing method disclosed herein, when a state of charge (SOC) of the battery is a predetermined reference value A or less, the charging may be performed at a first current value, and when the state of charge is more than the predetermined reference value A, the charging may be performed at the second current value. In this case, it is possible to simplify control of the initial charging. Here, the SOC indicates a state of charge of a battery based on the following: within a running voltage range in which the battery can be charged and discharged reversibly, a state of charge (that is, a full charge state) that achieves a maximum voltage is assumed 100%, and a state of charge (that is, a non-charge state) that achieves a minimum voltage is assumed 0%.

In one preferable aspect of the manufacturing method disclosed herein, the reference value A with respect to the SOC may be set to a range between 5% and 20% inclusive. Within such a range of the reference value A, it is possible to attain both shortening of a charging time and reduction of the gas generation amount at higher levels.

In one preferable aspect of the manufacturing method disclosed herein, a ratio (the second current value/the first current value) of the second current value to the first current value may be between 1/5 and 1/2 inclusive. Within such a range of the ratio (the second current value/the first current value), it is possible to attain both the shortening of the charging time and the reduction of the gas generation amount at higher levels. For example, the first current value may be between 1.5 C and 5 C inclusive, and the second current value may be between 0.1 C and 1 C inclusive.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
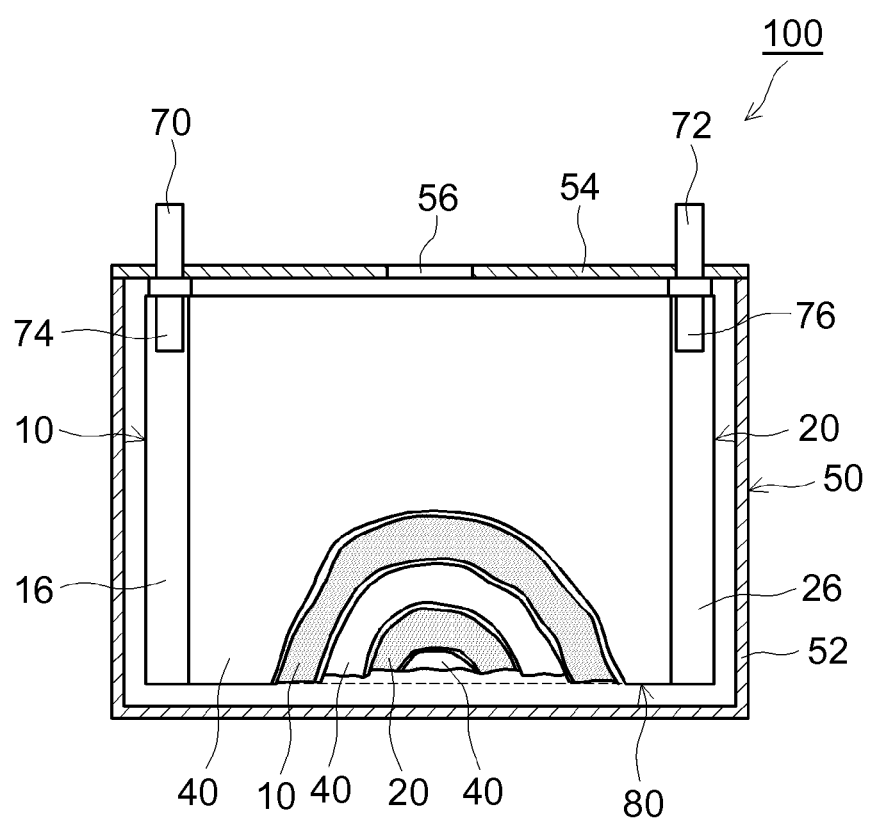
FIG. 1 is a view schematically illustrating a lithium-ion secondary battery according to one embodiment.

An embodiment of the present invention will be described below with reference to the drawings. In the drawings to be described below, the same reference sign is assigned to members/parts that yield the same effect. Note that a dimensional relationship (length, width, thickness, and the like) in each drawing does not show an actual dimensional relationship. Further, a matter that is not particularly mentioned in the present specification but is necessary for execution of the present invention (e.g., a configuration and a manufacturing method of an electrode body including a positive electrode and a negative electrode, a configuration and a manufacturing method of a separator or an electrolyte, a general technique related to an assembly of a lithium-ion secondary battery or the like battery, and so on) can be understood as a design matter of a person skilled in the art based on conventional techniques in the art.

The following describes a configuration of a nonaqueous electrolyte secondary battery and an initial charging process according to one embodiment of the present invention sequentially in this order. The following deals with a case where initial charging is performed on a lithium-ion secondary battery, but it is not intended to limit an application subject of the present invention.

<Lithium-ion Secondary Battery> A lithium-ion secondary battery 100 (hereinafter referred to as the "battery" as appropriate) of the present embodiment has the following configuration. That is, for example, as illustrated in FIG. 1, an electrode body (a wound electrode body) 80 and a nonaqueous electrolyte (not shown) are accommodated in a case 50 having a shape (a flat box shape) that can accommodate the wound electrode body 80 therein. The electrode body 80 is configured such that an elongated positive electrode sheet 10 and an elongated negative electrode sheet 20 are wounded in a flat shape via an elongated separator 40.

The case 50 includes a flat rectangular solid-shaped case main body 52 of which an upper end is opened, and a cover 54 covering the opening. As a material constituting the case 50, a metallic material such as aluminum and steel is preferably used (in the present embodiment, aluminum is used). Alternatively, the case 50 may be formed by molding a resin material such as polyphenylene sulfide (PPS) and polyimide resin. A positive terminal 70 electrically connected to a positive electrode of the wound electrode body 80, and a negative terminal 72 electrically connected to a negative electrode 20 of the electrode body 80 are provided on a top face (that is, the cover 54) of the case 50. A thin relief valve 56 configured to relieve an internal pressure of the case 50 of the battery when the internal pressure is increased to be larger than a predetermined level is formed between both terminals 70, 72 of the cover 54. The flat wound electrode body 80 and a nonaqueous electrolyte (not show) are accommodated in the case 50.

Figure 2:
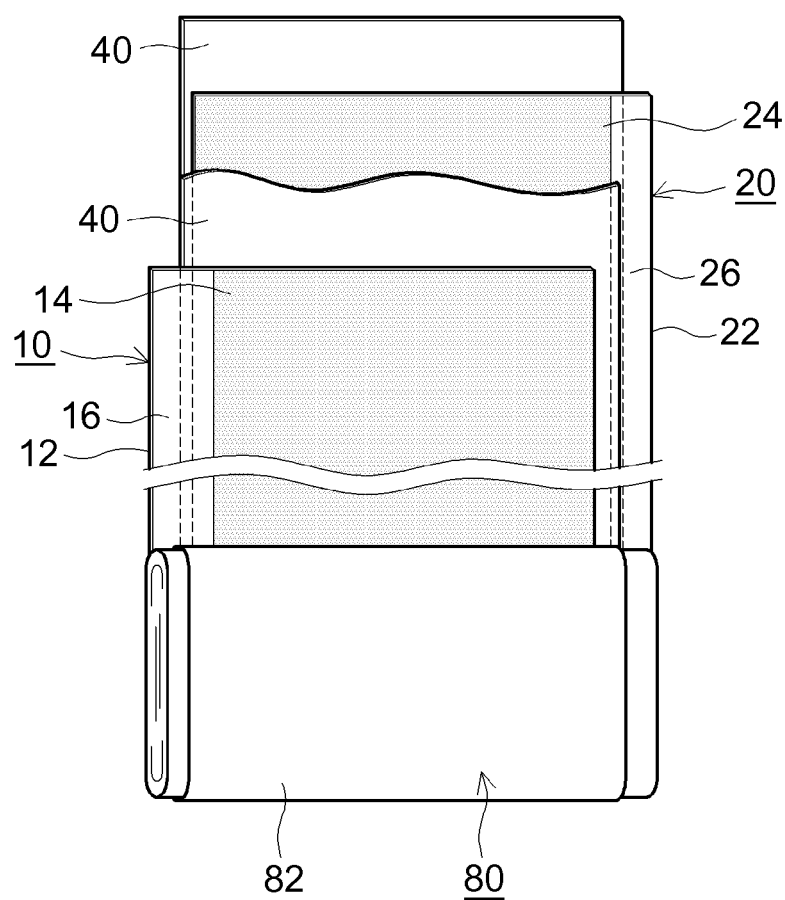
FIG. 2 is a view schematically illustrating a wound electrode body used in one embodiment.

The wound electrode body 80 according to the present embodiment is similar to a wound electrode body of a general lithium-ion secondary battery. As illustrated in FIG. 2, the wound electrode body 80 has an elongated (belt-shaped) sheet structure at a prior stage at which the wound electrode body 80 has not been assembled yet.

<Positive Electrode Sheet> The positive electrode sheet 10 has a structure in which a positive-electrode active material layer 14 including a positive-electrode active material is held on either surface of a foil-shaped positive current collector 12 having a continuous-sheet shape. Note that the positive-electrode active material layer 14 is not attached to one side edge (a left side edge part in the figure) of the positive electrode sheet 10 along its end side in a width direction thereof, so that a positive-electrode active material layer non-forming part 16 in which the positive current collector 12 is exposed with a given width is formed. Metal foil such as aluminum foil suitable for a positive electrode is preferably used for the positive current collector 12.

As the positive-electrode active material used in the present embodiment, one or more substances usable as a positive-electrode active material of a lithium-ion secondary battery and having a charge carrier (here, lithium) that can be held between layers of a negative-electrode active material (the after-mentioned graphite) at the time of charging can be used. An example of the positive-electrode active material is oxide (lithium transition metal oxide) including lithium and a transition metal element as constituent metallic elements. The oxide may have any of a layered rock salt structure, a spinel structure, and an olivine structure. Concrete examples of the oxide include $LiNi_{1/3}Mn_{1/3}Co_{1/3}O_2$ and the like.

The positive-electrode active material layer 14 may contain one or more materials usable as a component of a positive-electrode active material layer in a general lithium-ion secondary battery as needed, in addition to the positive-electrode active material. An example of such a material is a conductive material. As the conductive material, a carbon material such as carbon powder (e.g., acetylene black (AB)) or carbon fiber is preferably used. Alternatively, conductive metal powder such as nickel powder may be used. Other materials that can be used as a component of the positive-electrode active material layer may be various polymeric materials (e.g., polyvinylidene fluoride (PVDF)) that can function as a binding material (a binder) of the positive-electrode active material.

<Negative Electrode Sheet> Similarly to the positive electrode sheet 10, the negative electrode sheet 20 has a structure in which a negative-electrode active material layer 24 including a negative-electrode active material is held on either surface of a foil-shaped negative current collector 22 having a continuous-sheet shape. Note that the negative-electrode active material layer 24 is not attached to one, side edge (a right side edge part in the figure) of the negative electrode sheet 20 along its end side in a width direction thereof, so that a negative-electrode active material layer non-forming part 26 in which the negative current collector 22 is exposed with a given width is formed. Metal foil such as copper foil suitable for a negative electrode can be preferably used for the negative current collector 22, for example.

The negative-electrode active material used in the present embodiment contains graphite. The graphite contained in the negative-electrode active material layer 24 disclosed herein is preferably a material mainly containing natural graphite or artificial graphite, and particularly preferably natural graphite. Further, a material obtained by performing machining (grinding, spherical molding, or the like) on graphite such as natural graphite or artificial graphite into a particulate (spherical) shape can be used. For example, a material obtained by spheroidizing flake graphite can be used. An average particle diameter of the graphite thus spheroidized is preferably about 1 μm to 30 μm (typically, 5 μm to 20 μm) as a median diameter (average particle diameter $D_{50}$: 50% volume average particle diameter) that can be derived from a particle size distribution measured by a particle side distribution measuring apparatus based on a laser scattering/diffraction method, for example. Any well-known method (e.g., mechano-fusion and hybridization) can be employed without any limitation as a method for processing the graphite in a particulate shape.

The negative-electrode active material layer 24 can contain one or more materials usable as a component of a negative-electrode active material layer in a general lithium-ion secondary battery as needed, in addition to the negative-electrode active material. Examples of such a material include polymeric materials (e.g., PVDF, styrene butadiene rubber (SBR)) that can function as a binding material (a binder) of the negative-electrode active material, and polymeric materials (e.g., carboxymethyl cellulose (CMC)) that can function as a thickener of paste for forming a negative-electrode active material layer.

<Separator> As the separator 40 placed between the positive electrode sheet 10 and the negative electrode sheet 20, various porous sheets similar to a separator of a general lithium-ion secondary battery including an wound electrode body can be used. Preferable examples of the separator include porous resin sheets (films, nonwoven fabric, or the like) made of polyolefin resin such as polyethylene (PE) and polypropylene (PP). The porous resin sheets may have a single-layered structure, or a multilayer structure including two or more layers (e.g., a three-layer structure in which a PE layer is laminated on either side of a PP layer).

<Wound Electrode Body> At the time when the wound electrode body 80 is formed, the positive electrode sheet 10 and the negative electrode sheet 20 are laminated via the separator 40. At this time, the positive electrode sheet 10 and the negative electrode sheet 20 are put on top of one another in a slightly shifted manner in the width direction so that the positive-electrode active material layer non-forming part of the positive electrode sheet 10 and the negative-electrode active material layer non-forming part of the negative electrode sheet 20 protrude from opposite sides of the separator 40 in the width direction. A laminated body thus obtained is wound, and a wound body thus obtained is crushed from a side surface direction so that the wound body is flattened. Thus, the flat wound electrode body 80 can be manufactured.

In a central part of the wound electrode body 80 in a winding-shaft direction, a winding core portion 82 (that is, a portion where the positive-electrode active material layer 14 of the positive electrode sheet 10, the negative-electrode active material layer 24 of the negative electrode sheet 20, and the separator 40 are laminated thickly) is formed. Further, at both ends of the wound electrode body 80 in the winding-shaft direction, the electrode active material layer non-forming parts 16, 26 of the positive electrode sheet 10 and the negative electrode sheet 20 protrude outwardly from the winding core portion 82. A positive lead terminal 74 and a negative lead terminal 76 are attached, respectively, to such a positive-electrode side protruding part (that is, a non-forming part of the positive-electrode active material layer 14) 16 and such a negative-electrode side protruding part (that is, a non-forming part of the negative-electrode active material layer 24) 26. Hereby, the positive-electrode side protruding part 16 and the negative-electrode side protruding part 26 are electrically connected to the positive terminal 70 and the negative terminal 72, respectively.

<Nonaqueous Electrolyte> The wound electrode body 80 is then accommodated in the case main body 52 from an upper end opening of the case main body 52, and a suitable nonaqueous electrolyte is placed (poured) in the case main body 52. The nonaqueous electrolyte typically has a composition in which a supporting electrolyte is contained in a suitable nonaqueous solvent. As the nonaqueous solvent, ethylene carbonate (EC), ethylmethyl carbonate (EMC), dimethyl carbonate (DMC), diethyl carbonate (DEC), propylene carbonate (PC), and the like can be used, for example. Further, as the supporting electrolyte, lithium salts such as $LiPF_6$, $LiBF_4$, $LiAsF_6$, and $LiCF_3SO_3$ can be preferably used, for example.

After that, the opening is sealed by welding the opening to the cover 54, and thus, assembling of the lithium-ion secondary battery 100 according to the present embodiment is completed. A sealing process of the case 50 and an placement (filling) process of the electrolyte may be performed in a similar manner to a technique performed in manufacture of a conventional lithium-ion secondary battery, and do not characterize the present invention. Thus, assembling of the lithium-ion secondary battery 100 according to the present embodiment is completed. Note that, a sealing process of the case main body 52 and the placement (filling) process of the electrolyte may be performed in a similar manner to a technique performed in manufacture of a conventional lithium-ion secondary battery.

After that, an initial charging process is performed on the lithium-ion secondary battery 100 thus assembled. Here, the initial charging process is a charging process to be performed for the first time after the assembly of the battery (the assembly of battery constituents such as the positive electrode, the negative electrode, the electrolyte, and so on) is finished. The initial charging process may be typically performed such that an external power supply is connected between the positive electrode (the positive terminal) and the negative electrode (the negative terminal) of the battery, and charging (typically, constant voltage and constant current charging) is performed in an ordinary temperature range to reach a given voltage. A voltage (typically, a maximum achievable voltage) between the positive and negative terminals in the initial charging can vary depending on active materials and a nonaqueous solvent to be used. However, the voltage should be within a voltage range that can be shown when a SOC of the battery is about 80% or more (typically, 90% to 100%) at the time of full charge (typically, a rated capacity of the battery). For example, in a case of a battery that is fully charged at 4.2 V, it is preferable to adjust the battery to a range of about 3.8 to 4.2 V. When the initial charging is performed, lithium (a charge carrier) is pulled from the positive-electrode active material and released into the electrolyte as a lithium ion. Further, the lithium ion is intercalated and stored between layers of the graphite (the negative-electrode active material) provided on the negative electrode side. At the time of the initial charging, gas is generated in the battery due to reaction or the like between the nonaqueous electrolyte and the electrode, so that an internal pressure of the battery is increased.

Figure 3:
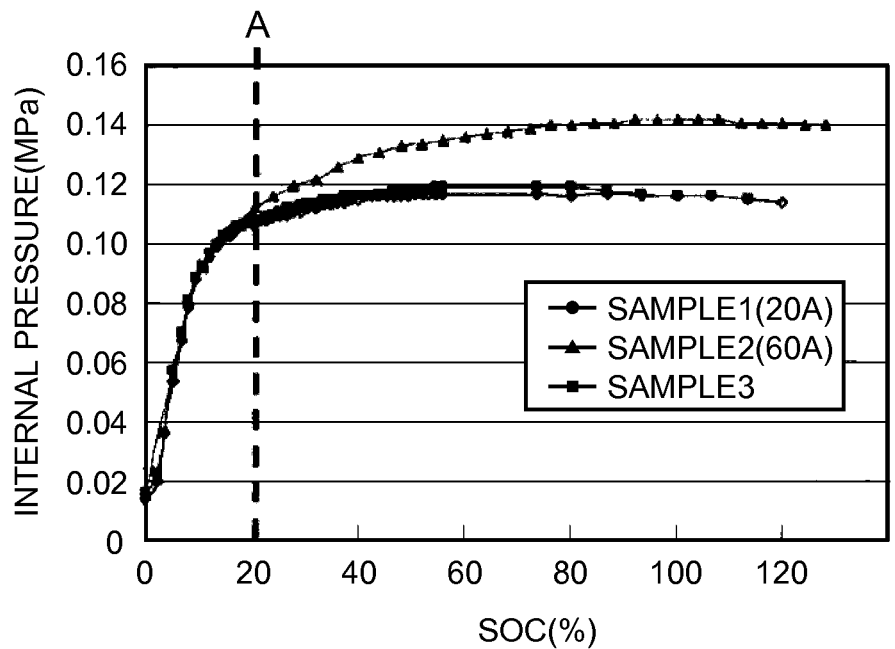
FIG. 3 is a graph showing a relationship between a SOC and a battery internal pressure.

If the internal pressure of the battery is increased excessively, a relief valve or the like of the battery is activated, so the battery may be unusable. Accordingly, it is desirable that a gas generation amount during the initial charging be as small as possible. Further, from the viewpoint of production efficiency, it is desirable to finish the charging in a short time. As a result of various experiments, the inventors found that when the initial charging is performed, a gas generation amount in the battery during the charging depends on a charging current value at some states of charge (SOC), but does not depend on the charging current value at some other states of charge (SOC). More specifically, a plurality of batteries just assembled and in a non-charge state was prepared. Then, the initial charging was performed thereon at different charging current values, and changes in battery internal pressures were measured. Among them, results of the initial charging performed at charging current values of 20 A and 60 A are shown in FIG. 3. FIG. 3 shows transitions of battery internal pressures during the initial charging. Sample 1 indicates a transition of a battery internal pressure obtained at 20 A, and Sample 2 indicates a transition of a battery internal pressure obtained at 60 A. Here, it is shown that as an increase degree of the battery internal pressure is larger, the gas generation amount is larger.

As shown in FIG. 3, the batteries charged at respective charging current values of 20 A, 60 A exhibit generally the same transition of the battery internal pressure at an early stage of the charging (e.g., a charging capacity of 0 to 5 Ah), and their gas generation amounts are not different so much. This means that the gas generation amount caused in the battery does not depend on a charging current value at the early stage of the charging. That is, since the gas generation amount does not depend on the charging current value at the early stage of the charging, if the battery is charged at a charging current value that is large to some extent, it is possible to shorten a charging time. On the other hand, at a later stage of the charging (e.g., a charging capacity of 5 to 30 Ah), the transitions of the battery internal pressures are markedly different from each other. More specifically, an increase degree of the internal pressure of the battery charged at a charging current value of 60 A is larger than that of the battery charged at a charging current value of 20 A. Further, the battery charged at a charging current value of 60 A exhibits a tendency to increase the gas generation amount. This means that the gas generation amount caused in the battery depends on the charging current value at the later stage of the charging. That is, since the gas generation amount depends on the charging current value at the later stage of the charging, if the battery is charged at a charging current value that is small to some extent, it is possible to reduce the gas generation amount.

<Initial Charging Process> From the above finding, the initial charging process of the present embodiment includes a gas generation amount dependency determination process, a first charging process, and a second charging process.

The gas generation amount dependency determination process is a process of determining whether or not a gas generation amount caused in a battery during charging depends on a charging current value. In the present embodiment, it is determined whether or not the gas generation amount depends on the charging current value based on a SOC of the battery. For example, when the SOC of the battery is not more than a predetermined reference value A, it is determined that the gas generation amount does not depend on the charging current value. Meanwhile, when the SOC of the battery is more than the predetermined reference value A, it is determined that the gas generation amount depends on the charging current value. The reference value A with respect to the SOC may be set to such a value that: in a SOC that is lower than the reference value A, the gas generation amount does not depend on the charging current value; and in a SOC that is higher than the reference value A, the gas generation amount depends on the charging current value. For example, based on the graph of FIG. 3, the reference value A with respect to the SOC can be set to a range of about 5% to 20% (preferably 10% or more, particularly preferably 15% or more).

The first charging process is a process of performing charging at a relatively large first current value, at the time when it is determined that the gas generation amount does not depend on the charging current value in the gas generation amount dependency determination process. The relatively large first current value in the first charging process is preferably set to a current value (a charging rate) at which the charging can be performed at a high speed. For example, it is desirable that the relatively large first current value be set to a range of about 1.5 C or more but 5 C or less (preferably, not less than 2 C but not more than 4 C). For example, it is preferable that the relatively high first current value be set to a current value higher than the aftermentioned second current value by 1 C or more (preferably 2 C or more, particularly preferably 3 C or more). By performing the charging at such a high rate, it is possible to shorten the charging time.

The second charging process is a process of performing charging at a second current value that is smaller than the first current value, at the time when it is determined that the gas generation amount depends on the charging current value in the gas generation amount dependency determination process. The relatively small second current value in the second charging process is preferably set to a current value (a charging rate) which is smaller than the first current value and at which gas is hard to be generated during the charging. For example, it is desirable that the relatively small second current value be set to a range of about 0.1 C or more but 1 C or less (preferably, not less than 0.5 C but not more than 1 C). When the charging is performed at such a low rate, it is possible to reduce the gas generation amount. Eventually, it is possible to yield an effect of restraining an increase of the battery internal pressure.

In a preferable example disclosed herein, a ratio (the second current value/the first current value) of the second current value in the second charging process to the first current value in the first charging process is not less than 1/5 but not more than 1/2, and preferably not less than 1/4 but not more than 2/5. Within such a ratio (the second current value/the first current value), it is possible to attain both the shortening of the charging time and the reduction of the gas generation amount at higher levels.

For the convenience sake, the charging current value (rate) and the reference value A (the criteria in the gas generation amount dependency determination process) in the initial charging process have been described based on the graph of FIG. 3. However, the charging current value and the reference value A provided according to the graph of FIG. 3 do not limit the present invention. For example, the charging current value and the reference value A can vary depending on materials of the battery (particularly, materials of the negative-electrode active material), the configuration of the battery, and so on. Because of this, a preliminary test may be performed so that the charging current value and the reference value A are determined based on a result of the preliminary test.

Figure 4:
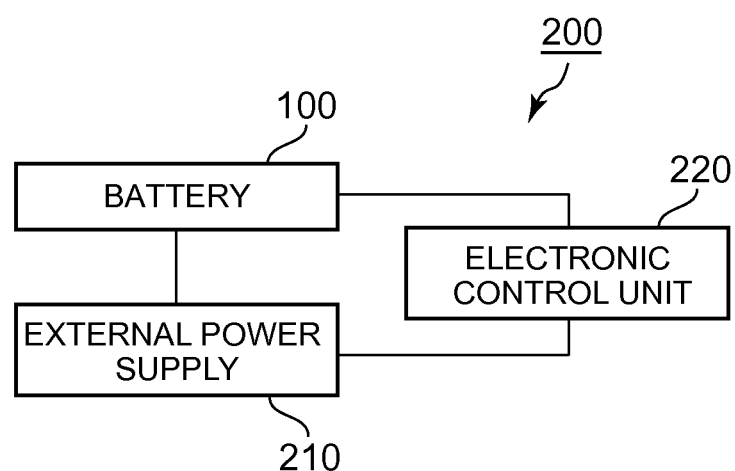
FIG. 4 is a block diagram illustrating a configuration of a charging control apparatus according to one embodiment.

FIG. 4 is a block diagram illustrating a configuration of a charging control apparatus 200 in which the charging processes of the initial charging process are embodied. As illustrated in FIG. 4, the charging control apparatus 200 includes an external power supply 210 connected to the lithium-ion secondary battery 100, and an electronic control unit 220 configured to control an operation of the external power supply 210. Since the lithium-ion secondary battery 100 has the same configuration as described earlier, the detailed description thereof is omitted.

The external power supply 210 is connected between the positive electrode (the positive terminal) and the negative electrode (the negative, terminal) of the lithium-ion secondary battery, and is configured to charge the battery 100 at the first current value or the second current value. The external power supply 210 can include an electric power feeder (charger) configured to supply electric power that can charge the battery 100, for example.

The electronic control unit 220 includes a CPU (central processing unit), a ROM (read only member) in which to store a program executed by the CPU, a RAM (random access memory) in which to store data temporarily, and input/output ports (not shown). Signals (outputs) from the external power supply 210 and the battery 100 are input into the electronic control unit 220 via the input port. The electronic control unit 220 adds up current to be charged to the battery based on data input from the external power supply 210 and the battery 100, so as to calculate a SOC of the battery. Further, when the SOC thus calculated is the predetermined reference value A or less, the electronic control unit 220 outputs a driving signal to the external power supply 210 via the output port so as to charge the battery 100 at the first current value. In the meantime, when the SOC thus calculated is more than the predetermined reference value A, the electronic control unit 220 outputs a driving signal to the external power supply 210 via the output port so as to charge the battery 100 at the second current value. Note that data on the reference value A with respect to the SOC, the first current value, and the second current value are stored in the ROM.

Figure 5:
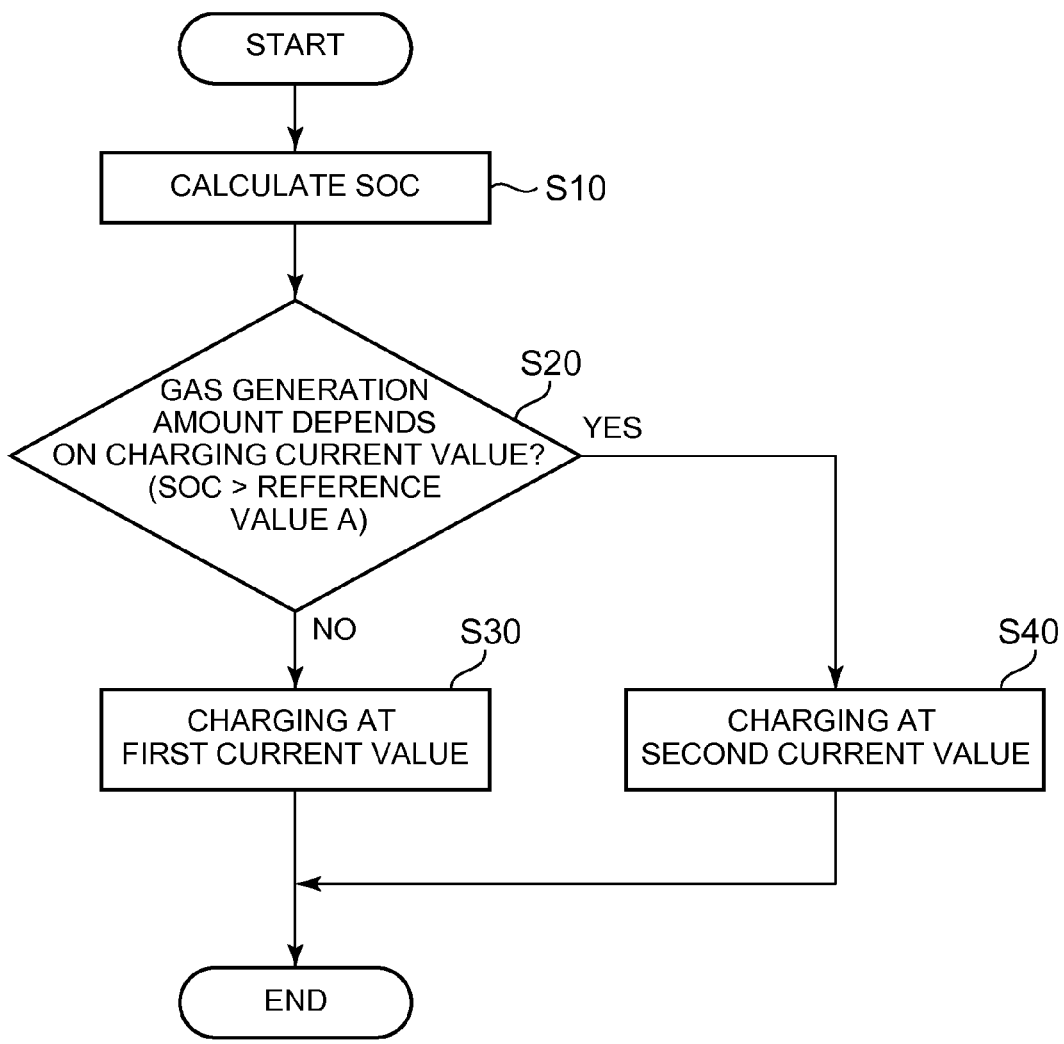
FIG. 5 is a flowchart illustrating a control flow of the charging control apparatus according to one embodiment.

Next will be described an operation of the charging control apparatus 200 thus configured. FIG. 5 is a flowchart illustrating an example of a processing routine performed by the electronic control unit of the charging control apparatus 200 according to the present embodiment. This routine is performed repeatedly every predetermined time.

As illustrated in FIGS. 4 and 5, initially in step S10, in order to determine whether or not a gas generation amount caused in the battery during charging depends on a charging current value, the charging control apparatus 200 adds up current to be charged to the battery 100 based on data input from the external power supply 210 and the battery 100, so as to calculate a SOC of the battery 100.

In step S20, based on a calculation value of the SOC obtained in step S10, it is determined whether the gas generation amount depends on the charging current value or the gas generation amount does not depend on the charging current value. More specifically, the reference value A with respect to the SOC is set in advance, and it is determined whether the calculation value of the SOC exceeds the reference value A or not. When the calculation value of the SOC is not more than the reference value A (NO), it is determined that the gas generation amount does not depend on the charging current value, and step S30 is performed. In step S30, the external power supply 210 is driven to charge the battery 100 at the first current value. In the meantime, when the calculation value of the SOC exceeds the reference value A (YES), it is determined that the gas generation amount depends on the charging current value, and step S40 is performed. In step S40, the external power supply 210 is driven to charge the battery 100 at the second current value. After that, the processing routine is repeated to continue the charging until the SOC reaches its upper limit (e.g., 100%).

In the above embodiment, when the gas generation amount caused in the battery during the charging does not depend on the charging current value, the charging is performed at the relatively large first current value. Accordingly, it is possible to shorten a charging time as compared with a conventional technique. Further, when the gas generation amount caused in the battery during the charging depends on the charging current value, the charging is performed at the second current value smaller than the first current value. Accordingly, it is possible to restrain generation of gas in the battery, as compared with the case where the charging is performed at the first current value. According to the embodiment, it is possible to prevent an increase in the internal pressure of the battery and to finish the charging quickly.

Figure 6:
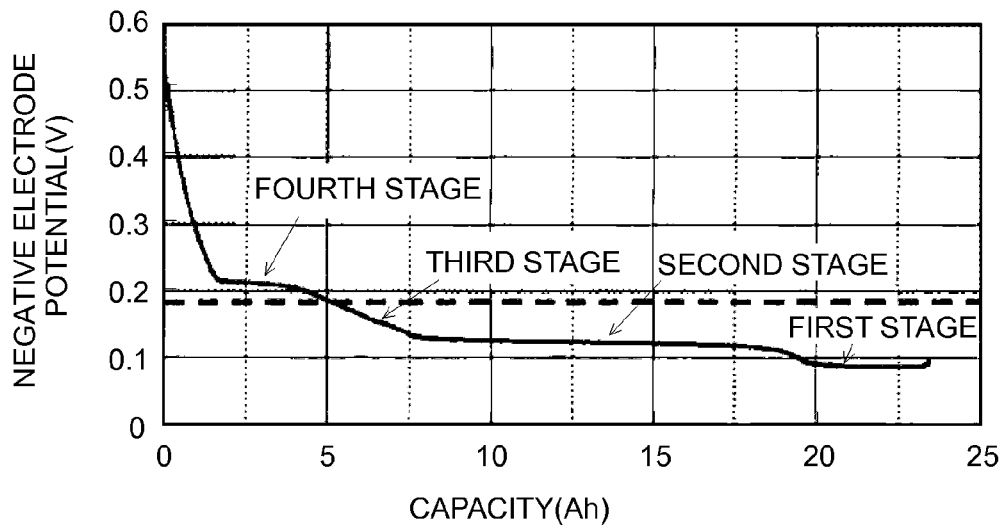
FIG. 6 is a graph showing a relationship between a battery capacity and a voltage.

Note that, in the present embodiment, the gas generation amount caused in the battery during the charging depends on the charging current value at some states of charge (SOC), but does not depended on the charging current value at some other states of charge (SOC). It is considered that such action mechanism is caused due to lithium being stored between layers of the graphite (the negative-electrode active material) included in the battery. That is, when the initial charging is performed, a lithium ion is intercalated and stored between the layers of the graphite (the negative-electrode active material) provided on the negative electrode side. At this time, as an amount of lithium stored between the layers of the graphite increases, the structure of the graphite is changed from a fourth stage followed by a third stage, a second stage, and a first stage, which is known well (see a charging curve of graphite in FIG. 6). According to the finding of the inventors, before the fourth stage shifts to the third stage, a quantity of electricity used for a lithium intercalation reaction into the graphite is the same rate as that of a gas generation reaction (lithium intercalation reaction=gas generation reaction speed). On that account, there is no correlation between the charging current value and the gas generation amount. However, when the fourth stage is saturated and shifts to the first to third stages, the energy barrier to the lithium intercalation reaction is increased. Accordingly, a balance moves to the gas generation reaction (lithium intercalation reaction<gas generation reaction speed), so a correlation presumably occurs between the charging current value and the gas generation amount. Note that the present invention can be easily performed based on information (the configurations and the like of the battery and the charging control apparatus) disclosed herein. Accordingly, the action mechanism related to the correlation between the gas generation amount and the charging current value is not necessary for the understanding and execution of the present invention. The description about the action mechanism is just an example, and it is not intended to limit the present invention to the action mechanism described above.

Based on the above finding, it is preferable that the reference value A with respect to the SOC be a value within a range of the SOC in which a ratio (lithium atom/carbon atom) between lithium and carbon held between the layers of the graphite is not less than 1/30 but not more than 1/20 (preferably not less than 1/25 but not more than 1/22, e.g., about 1/24) (that is, before the fourth stage of the graphite shifts to the third stage). Within such a range of the reference value A, it is possible to surely attain both the shortening of the charging time and the reduction of the gas generation amount.

The following describes an exemplary test about the present invention, but it is not intended to limit the present invention to the following exemplary test.

Powder of $LiNi_{1/3}Co_{1/3}Mn_{1/3}O_2$ as the positive-electrode active material, acetylene black (AB) as the conductive material, and polyvinylidene fluoride (PVDF) as the binder were mixed in N-methylpyrrolidone (NMP) so that a mass ratio between these materials was 89:3:8. Thus, paste for a positive-electrode active material layer was prepared. The paste for a positive-electrode active material layer was applied, in a belt shape, to either surface of a positive current collector (aluminum foil with a thickness of around 15 μm) in a continuous-sheet shape, and then dried. Thus, a positive electrode sheet having a positive-electrode active material layer on either surface of the positive current collector was formed.

Graphite powder as the negative-electrode active material, styrene butadiene rubber (SBR) as the binder, and carboxymethyl cellulose (CMC) as the thickener were mix in water so that a mass ratio between these materials was 98:1:1. Thus, paste for a negative-electrode active material layer was prepared. The paste for a negative-electrode active material layer was applied, in a belt shape, to either surface of a negative current collector (copper foil with a thickness of around 10 μm) in a continuous-sheet shape, and then dried. Thus, a negative electrode sheet having a negative-electrode active material layer on either surface of the negative current collector was formed.

Then, the positive electrode sheet and the negative electrode sheet were wound via two separator sheets, and thus, a wound electrode body was formed. The wound electrode body was accommodated in a battery outer case, and an opening of the battery outer case was sealed tightly. After water content was removed by drying a cell, a nonaqueous electrolyte was poured from a filling opening. Then, an impregnation process was performed for 24 hours. The nonaqueous electrolyte used herein was obtained as follows. A mixed solvent containing ethylene carbonate (EC), dimethyl carbonate (DMC), and ethylmethyl carbonate (EMC) such that a volume ratio thereof was 3:3:4 was prepared. Then, $LiPF_6$ as a supporting electrolyte was dissolved in the mixed solvent so that a concentration thereof was about 1 mol/L. A lithium-ion secondary battery was assembled in this way.

<Initial Charging Process> An initial charging process was performed on 5 lithium-ion secondary batteries assembled in the above manner. Here, Samples 1 to 3 were charged at different charging current values in the initial charging process. In Sample 1, an operation (charging) of causing Li to be stored in graphite was performed on a lithium-ion secondary battery at a current value of 20 A (0.8 C in a converted rate) until a voltage reached 3.95 V. Further, in Sample 2, an operation (charging) of causing Li to be stored in graphite was performed on a lithium-ion secondary battery at a current value of 60 A (2.4 C in a converted rate) until a voltage reached 3.95 V. Further, in Sample 3, an operation (a first charging process) of causing Li to be stored in graphite was performed at a current value of 60 A until a charging capacity reached 5 Ah (SOC: 20%), and then, an operation (a second charging process) of causing Li to be stored in graphite was performed 15 at a current value of 20 A until a voltage reached 3.95 V. Respective charging times of Samples 1 to 3 are shown in Table 1. Further, a pressure sensor was attached in each battery outer case, so as to evaluate a change of a battery internal pressure during the initial charging. The results are shown in FIG. 3.

Further, in order to examine the influence on battery characteristics when initial charging conditions were changed, a high temperature storage test and a charging and discharging cycle test were performed.

Figure 7:
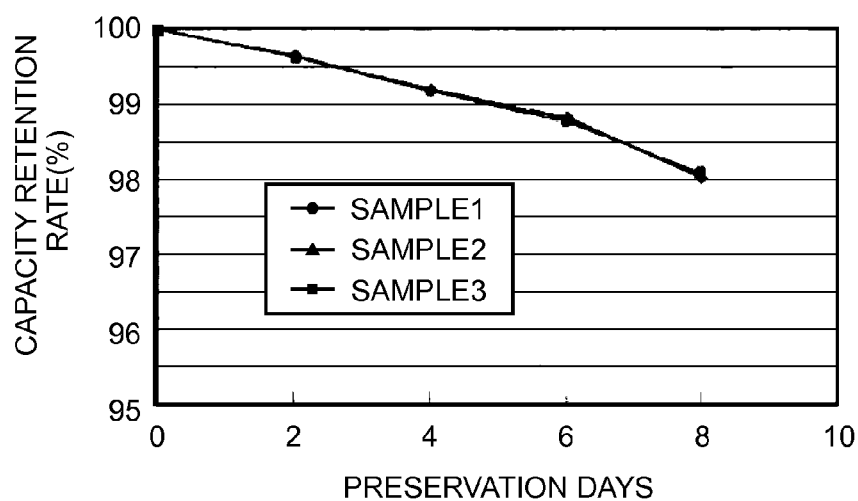
FIG. 7 is a graph showing a relationship between preservation days under high temperature and a capacity retention rate.

The high temperature storage test was performed as follows. After the lithium-ion secondary battery of each sample was adjusted to a SOC of 85%, the lithium-ion secondary battery was accommodated in a constant-temperature bath of 60° C., and high-temperature aging was performed for 64 days. Further, when predetermined days passed from a test start, a battery capacity was measured, and a capacity retention rate after high temperature preservation was found according to [(battery capacity after high-temperature preservation)/(initial capacity)]×100(%). A transition of the capacity retention rate after high temperature preservation is shown in FIG. 7. In FIG. 7, a horizontal axis indicates a square root of preservation days, and a vertical axis indicates a capacity retention rate. Further, the capacity retention rate after high temperature preservation for 64 days is shown in Table 1.

Figure 8:
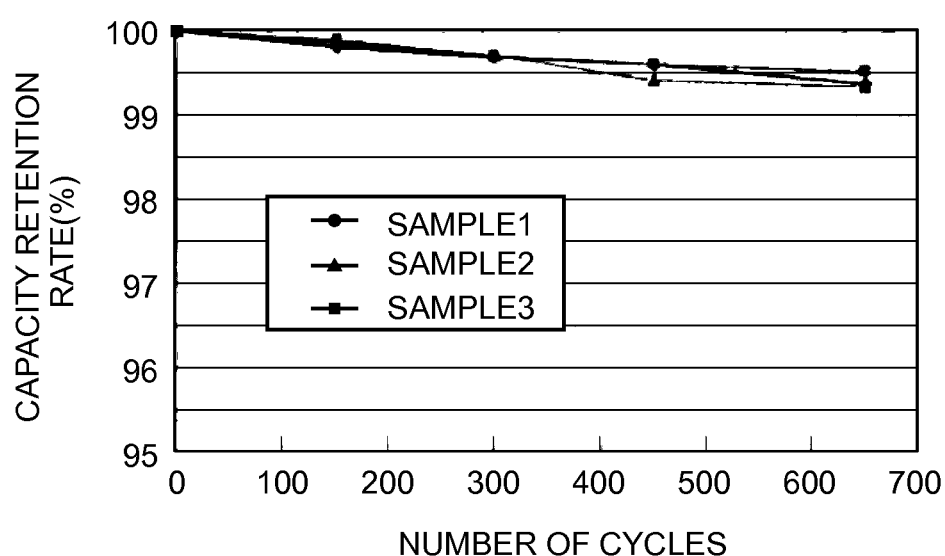
FIG. 8 is a graph showing a relationship between the number of cycles and a capacity retention rate.

The charging and discharging cycle test was performed as follows. The lithium-ion secondary battery of each sample was charged to a SOC of 90% at a current value of 2 C under a temperature of 25° C. Then, a charging and discharging cycle in which discharging was performed at a current value of 2 C until the SOC reached 20% was repeated 650 times in succession. At this time, a battery capacity was measured at a time point at which the cycle was repeated for a predetermined number of times, and a capacity retention rate after the cycles was found according to [(battery capacity after cycles)/(initial capacity)]×100(%). A transition of the capacity retention rate after cycles is shown in FIG. 8. Further, a capacity retention rate after 650 cycles is shown in Table 1.

Note that the battery capacity and the initial capacity were obtained as follows. That is, after a battery was charged at a current value of 1 C under a temperature of 25° C. until a voltage reached 4.1 V, the battery was further charged for two hours in a constant-voltage manner. The battery thus charged was discharged at a current value 1 C at 25° C. until the voltage reached 3.0 V. A discharge capacity at this time was assumed the battery capacity and the initial capacity.

TABLE 1

|  | charging current value | charging time (min) | capacity retention rate after high temperature preservation (%) | capacity retention rate after cycles (%) |
|---|---|---|---|---|
| Sample 1 | 20 A | 70 | 98.1 | 99.5 |
| Sample 2 | 60 A | 22 | 98.0 | 99.3 |
| Sample 3 | 60 A → 20 A | 62 | 98.1 | 99.4 |

As illustrated in FIG. 3, transitions of battery internal pressures of Samples 1 to 3 during the initial charging exhibit similar behavior up to a capacity of 5 Ah. Further, in the charging process after the capacity of 5 Ah, Samples 1, 3 charged at a charging current value of 20 A had a maximum internal pressure (a maximum achievable point) that was lower, by 0.02 MPa or more, than that of Sample 2 charged at a charging current value of 60 A. Thus, an increase in the internal pressure was not observed so much in Samples 1, 3. Further, Sample 3 charged at a charging current value of 60 A up to the capacity of 5 Ah was able to shorten the charging time by eight minutes in comparison with Sample 1 charged at a charging current value of 20 A. From this result, according to a charging program of Sample 3, it was confirmed that the charging could be completed in a short time while preventing an increase in the internal pressure of the battery. Note that any significant difference was not observed between Samples 1 to 3 in terms of the capacity retention rate after high temperature preservation and the capacity retention rate after cycles. That is, it was confirmed that, even if the charging current value was changed in the middle of charging like the charging program of Sample 3, it did not affect battery characteristics. Even in this regard, it can be said that the present invention is a significant technique.

The specific example of the present invention has been explained in detail. However, the example is for illustration only, and does not limit the scope of the claims. The technique described in the scope of the claims includes the foregoing example with various modifications and changes.

For example, in the above embodiment, a timing of changing the charging current value is determined based on the SOC obtained by current accumulation, but measuring means of the SOC is not limited to this. The measuring means of the SOC can be optionally selected from methods routinely used in general batteries. For example, the SOC may be estimated from a terminal voltage by use of a map or the like indicative of a correlation between a terminal voltage and the SOC.

Further, in the above embodiment, the timing of changing the charging current value is controlled by monitoring the SOC, but the present invention is not limited to this. For example, the terminal voltage may be monitored to determine the timing of changing the charging current value. Note that, in a case where the voltage is monitored, when the charging current value is increased, the voltage may be hard to be monitored due to the influence of overvoltage. Accordingly, from the viewpoint of performing the control precisely and stably without being affected by overvoltage, it is preferable to perform the control by monitoring the SOC as described in the above embodiment.

What is claimed is:

1. A manufacturing method for a nonaqueous electrolyte secondary battery, the nonaqueous electrolyte secondary battery including
a relief valve,
a negative-electrode active material including graphite, and
a positive-electrode active material including a charge carrier that is held between layers of the graphite at a time of charging,
the manufacturing method comprising:
assembling the nonaqueous electrolyte secondary battery including a positive electrode and a negative electrode; and
performing an initial charging process as first charging on the nonaqueous electrolyte secondary battery, the initial charging process including:
determining whether or not a gas generation amount depends on a charging current value, based on a state of charge or a terminal voltage of the nonaqueous electrolyte secondary battery,
performing charging at a first current value when a gas generation amount generated in the nonaqueous electrolyte secondary battery during the charging does not depend on a charging current value, and
performing the charging at a second current value smaller than the first current value when the gas generation amount depends on the charging current value.

2. The manufacturing method according to claim 1, wherein:
when a state of charge of the nonaqueous electrolyte secondary battery is a predetermined value or less, the nonaqueous electrolyte secondary battery is charged at the first current value; and
when the state of charge of the nonaqueous electrolyte secondary battery is more than the predetermined value, the nonaqueous electrolyte secondary battery is charged at the second current value,
wherein the predetermined value is a criteria value that indicates whether or not the gas generation amount depends on a charging current value.

3. The manufacturing method according to claim 2, wherein:
the predetermined value is set to a range between 5% and 20% inclusive.

4. The manufacturing method according to claim 1, wherein:
a ratio of the second current value to the first current value is between 1/5 and 1/2 inclusive.

5. The manufacturing method according to claim 1, wherein:
the first current value is between 1.5 C and 5 C inclusive, and the second current value is between 0.1 C and 1 C inclusive.

6. The manufacturing method according to claim 1, wherein:
the charge carrier is lithium.

7. A manufacturing method for a nonaqueous electrolyte secondary battery, the nonaqueous electrolyte secondary battery including a negative-electrode active material, and a positive-electrode active material including a charge carrier,
wherein the manufacturing method comprises:
assembling the nonaqueous electrolyte secondary battery including a positive electrode and a negative electrode;
performing an initial charging process on the nonaqueous electrolyte secondary battery, wherein the initial charging process consists of:
performing charging at a first current value when a gas generation amount generated in the nonaqueous electrolyte secondary battery during the charging does not depend on a charging current value, and
performing the charging at a second current value smaller than the first current value when the gas generation amount depends on the charging current value.

8. The manufacturing method according to claim 7, wherein:
when a state of charge of the nonaqueous electrolyte secondary battery is a predetermined value or less, the nonaqueous electrolyte secondary battery is charged at the first current value; and
when the state of charge of the nonaqueous electrolyte secondary battery is more than the predetermined value, the nonaqueous electrolyte secondary battery is charged at the second current value,
wherein the predetermined value is a criteria value that indicates whether or not the gas generation amount depends on a charging current value.

9. A manufacturing method for a nonaqueous electrolyte secondary battery, the nonaqueous electrolyte secondary battery including a negative-electrode active material, and a positive-electrode active material including a charge carrier,
wherein the manufacturing method comprises:

assembling the nonaqueous electrolyte secondary battery including a positive electrode and a negative electrode;

performing an initial charging process on the nonaqueous electrolyte secondary battery, wherein the initial charging process comprises:

performing charging at a first current value when a gas generation amount generated in the nonaqueous electrolyte secondary battery during the charging does not depend on a charging current value, performing the charging at a second current value smaller than the first current value when the gas generation amount depends on the charging current value, and terminating the charging after charging at the second current value.

10. The manufacturing method according to claim 9, wherein:

when a state of charge of the nonaqueous electrolyte secondary battery is a predetermined value or less, the nonaqueous electrolyte secondary battery is charged at the first current value; and when the state of charge of the nonaqueous electrolyte secondary battery is more than the predetermined value, the nonaqueous electrolyte secondary battery is charged at the second current value, wherein the predetermined value is a criteria value that indicates whether or not the gas generation amount depends on a charging current value.

* * * * *